US008825186B2

(12) United States Patent
Butters et al.

(10) Patent No.: US 8,825,186 B2
(45) Date of Patent: Sep. 2, 2014

(54) DIGITAL AUDIO PROCESSING

(75) Inventors: Jeff Butters, Reading (GB); Tim Addy, Winchester (GB)

(73) Assignee: Snell Limited, Havant, Hampshire (GB)

( * ) Notice: Subject to any disclaimer, the term of this patent is extended or adjusted under 35 U.S.C. 154(b) by 1160 days.

(21) Appl. No.: 12/190,853

(22) Filed: Aug. 13, 2008

(65) Prior Publication Data

US 2009/0048696 A1 Feb. 19, 2009

(30) Foreign Application Priority Data

Aug. 13, 2007 (GB) .................................. 0715758.9

(51) Int. Cl.
*G06F 17/00* (2006.01)
*G10L 21/01* (2013.01)

(52) U.S. Cl.
CPC .................................... *G10L 21/01* (2013.01)
USPC ........................................................ 700/94

(58) Field of Classification Search
USPC ........................................................ 700/94
See application file for complete search history.

(56) References Cited

U.S. PATENT DOCUMENTS 3,812,423 A * 5/1974 Cronson et al. ............... 324/638
4,434,498 A 2/1984 Mathieu
4,899,146 A * 2/1990 Podolak et al. ................ 341/51
4,953,214 A * 8/1990 Takeguchi et al. ............ 704/230
5,136,529 A * 8/1992 Makie et al. .................. 702/189
5,298,899 A * 3/1994 Oh et al. ....................... 341/132
5,692,017 A * 11/1997 Shiokawa ..................... 375/346
5,834,930 A * 11/1998 Hung et al. ................ 324/76.58
6,144,413 A * 11/2000 Zatsman ....................... 348/525
6,304,297 B1 * 10/2001 Swan ........................... 348/556
6,697,688 B1 * 2/2004 Kuwaoka ........................ 700/94
6,724,834 B2 * 4/2004 Garrett et al. ................ 375/317
6,757,296 B1 * 6/2004 Larsson et al. ............... 370/468
6,836,456 B2 * 12/2004 Tonami ...................... 369/59.22
6,961,698 B1 * 11/2005 Gao et al. ...................... 704/229
7,088,774 B1 8/2006 Moni et al.
7,194,379 B1 * 3/2007 Chivers ......................... 702/176
7,672,742 B2 * 3/2010 Ng et al. ......................... 700/94
7,894,489 B2 * 2/2011 Shenoi .......................... 370/516
8,254,404 B2 * 8/2012 Rabenko et al. .............. 370/429
2003/0043856 A1 3/2003 Lakaniemi et al.
2005/0021327 A1 1/2005 Gilbert
2005/0053130 A1 * 3/2005 Jabri et al. .................... 375/240

(Continued)

FOREIGN PATENT DOCUMENTS

EP 1 684 516 7/2006
GB 2039448 8/1980

(Continued)

OTHER PUBLICATIONS

European Search Report for European Application No. EP 08 16 2264 dated Oct. 16, 2008.

*Primary Examiner* — Paul McCord
(74) *Attorney, Agent, or Firm* — Peal Cohen Zedek Latzer Baratz LLP

(57) ABSTRACT

The invention concerns digital audio processing and in particular the detection of periods where samples can be deleted or repeated unobtrusively so as to change the average sample-rate or to provide time delay modification. Differences between succeeding sample values are evaluated and compared with a threshold and samples are deleted or repeated where two or more consecutive sample value differences are less than the said threshold value.

14 Claims, 2 Drawing Sheets

(56) References Cited

U.S. PATENT DOCUMENTS

| | | | | |
|---|---|---|---|---|
| 2006/0029142 | A1* | 2/2006 | Arad | 375/260 |
| 2006/0039471 | A1* | 2/2006 | Dane et al. | 375/240.16 |
| 2006/0146185 | A1* | 7/2006 | Chen | 348/410.1 |
| 2006/0184261 | A1* | 8/2006 | Ng et al. | 700/94 |
| 2006/0197692 | A1* | 9/2006 | Gong et al. | 341/155 |
| 2006/0222130 | A1* | 10/2006 | Dominique et al. | 375/355 |
| 2008/0007653 | A1* | 1/2008 | Mori et al. | 348/462 |
| 2008/0082189 | A1* | 4/2008 | Kuwaoka | 700/94 |
| 2009/0103573 | A1* | 4/2009 | LeBlanc et al. | 370/526 |

FOREIGN PATENT DOCUMENTS

| | | | |
|---|---|---|---|
| GB | 2039448 | A * | 8/1980 |
| JP | 56080938 | | 7/1981 |
| WO | WO 02/32054 | | 4/2002 |

* cited by examiner

DIGITAL AUDIO PROCESSING

FIELD OF INVENTION

The invention concerns digital audio processing and in particular the detection of periods where samples can be deleted or repeated unobtrusively so as to change the average sample-rate or to provide time delay modification.

BACKGROUND OF THE INVENTION

It is often necessary to modify the sample rate of a digital audio signal or to change the number of samples that represent a particular time segment of an audio signal in a file or digital store. Such modifications are used to synchronise the sample rates of independently-sourced digital signals, or to modify the size of a file or data set. A temporary increase or decrease in the sampling frequency can also be used as a means of delaying or advancing the timing of audio information.

Where there are no limitations on processing time or complexity, interpolation of new samples having the required sampling frequency and phase by taking weighted sums of existing samples is often the preferred method. However, a known alternative method, which has the advantage of not introducing significant delay in real-time processing applications, is the deletion or repetition of samples at points chosen to minimise the audibility of the deletion or repetition. An effective method for identifying such points is thus an important feature of audio sample rate converters operating by sample deletion and repetition.

SUMMARY OF THE INVENTION

The inventors have appreciated that points for unobtrusive sample repetition or deletion can be determined from evaluation of the differences between the values of succeeding audio samples.

The invention consists, in one aspect, of a method and apparatus for changing the number of samples representing a time segment of an audio signal by deleting or repeating existing samples at positions in the said time segment dependant on the values of said audio samples characterised in that differences between succeeding sample values are evaluated and compared with a threshold and samples are deleted or repeated where two or more consecutive differences are less than the said threshold value.

In some embodiments stereo audio is processed and respective left and right differences between succeeding sample values are evaluated and samples are repeated or deleted where both the left difference and the right difference are below the said threshold at two or more consecutive sample points.

Suitably, a sample is deleted or repeated in response to a defined number of consecutive inter-sample differences being less than the threshold value.

Advantageously, the said threshold value is reduced when samples are deleted or repeated and the said threshold value is increased when a difference between succeeding samples exceeds the said threshold value.

In one embodiment sample deletion or repetition is inhibited during a set number of sample periods following a point of sample deletion or repetition.

Suitably, the said set number of sample periods during which sample deletion or repetition is inhibited is adjusted in dependence on a cumulative measure of inter-sample difference values.

Advantageously, the said set number of sample periods during which sample deletion or repetition is inhibited is reduced in response to an increase in the said threshold value.

In an alternative embodiment the said set number of sample periods during which sample deletion or repetition is inhibited is adjusted in dependence upon a measure of audio frequency.

The said measure of audio frequency may be a count of zero crossings of the audio signal.

In a further embodiment the said set number of sample periods during which sample deletion or repetition is inhibited is adjusted in dependence upon a measure of absolute audio amplitude.

BRIEF DESCRIPTION OF THE DRAWINGS

An example of the invention will now be described with reference to the drawings in which.

DETAILED DESCRIPTION OF THE INVENTION

Figure 1:
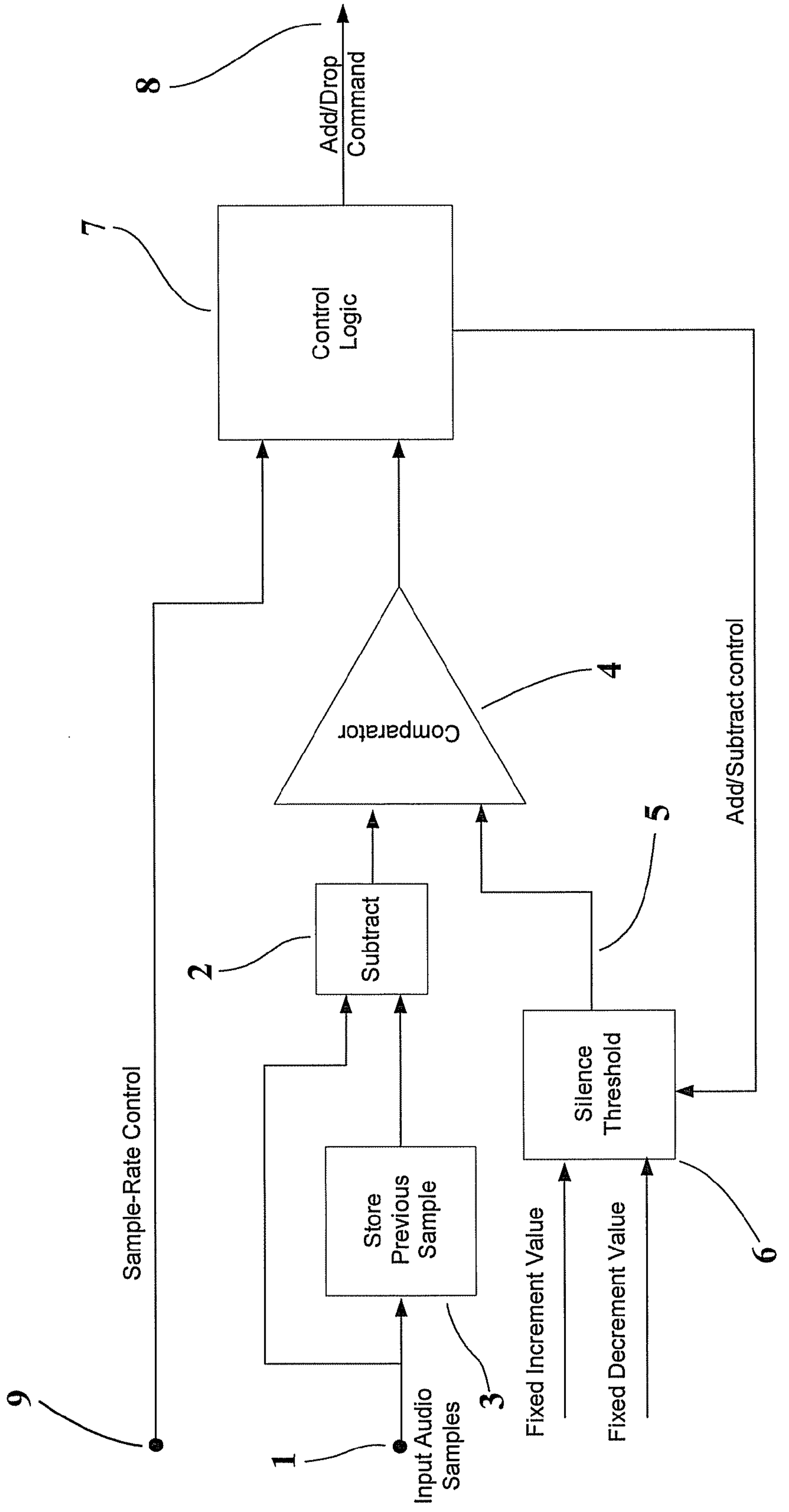
FIG. 1 shows a block diagram of a system for controlling the addition or deletion of audio samples according to an exemplary embodiment.

A system for identifying candidate digital audio samples for nearly-inaudible deletion or repetition according to an exemplary embodiment will now be described with reference to FIG. 1. The description relates to a real-time process on a stream of sample values; however, the skilled person will appreciate that the method is equally applicable to non-real-time processing.

An input stream of audio samples (1) is applied to a subtractor (2) and a single-sample store (3). The subtractor (2) determines the magnitude of the value-difference between the current sample and the previous sample from the store (3). This value-difference magnitude between a pair of consecutive samples (separated in time by one period of the sampling clock) is input to a comparator (4) which compares it with a threshold value (5). The threshold value (5), which is greater than zero, is determined by a silence-threshold block (6) which will be described in detail below.

If the audio is silent, successive samples will have the same value and so the value-difference magnitude will be zero, and the comparator (4) will determine that it is below the threshold value (5). If the audio is nearly-silent the difference is also likely to be below the threshold value, but the outcome will depend on the frequency spectrum and the amplitude of the audio; lower-frequency, lower-amplitude audio will be more likely to give a difference-value below a given threshold value.

The output from the comparator (4) is passed to a control logic block (7) which generates commands (8) to delete (drop) or repeat the current sample in dependence upon a sample-rate control input (9). The control input (9) is derived from an external process (not illustrated) which determines whether the number of samples needs to be increased or decreased. If the external process determines that fewer samples are required, the control signal (9) causes the control logic block (7) to issue sample deletion commands (8) at points in the audio where the deletion is unlikely to be audible. Similarly, if the external process determines that additional samples are required, the control signal (9) causes the control logic block (7) to issue sample repetition commands (8) at points of low audibility. If no change to the number of samples is required, the control signal (9) causes the control logic (7) to prevent the output of sample repetition or deletion commands (8).

In some embodiments the control logic block (7) only outputs a sample deletion or sample repetition command if a fixed, small number (say 4) consecutive value-difference magnitudes have been less than the threshold (5); and/or, after a command has been issued, no further commands are issued until a further fixed number (say 1,020) of succeeding input samples have been received. These numbers are chosen to achieve the necessary maximum range of adjustment of the sample rate and to minimise the audibility of the process. The commands (8) are passed to an external process (not illustrated) which can either delete or repeat the current sample so as to obtain a modified sample stream or set of samples.

The silence-threshold block (6) determines the threshold value (5) so as to ensure that samples resulting in a value-difference less than the threshold value can be deleted or repeated with minimal subjective distortion to the audio. This is done by a process of continuous adjustment of the threshold in response to the sequence of audio samples to be processed. The threshold is lowered by a fixed decrement value whenever a sample deletion or repetition command is issued; and, the threshold is raised by a fixed increment value whenever the current value-difference magnitude is greater than the current threshold.

The level at which the threshold stabilises for a given audio signal of constant amplitude will depend on the ratio of the rate of threshold increment to the rate of threshold decrement. The fixed decrement value and the fixed increment value can be chosen so as to achieve automatically a threshold value for which sample deletion or repetition is substantially inaudible for a wide range of audio material. Suitable maximum and minimum limits to the variation of the threshold value can also be applied and the increment and decrement functions inhibited when necessary to keep the threshold value within these limits. The maximum and minimum limits can be set at the levels at which the audibility of sample deletion or repetition is just acceptable for the loudest and quietest signals respectively.

The process of threshold increment and decrement can continue during periods where, according to the control signal (9), no sample modification is required. This will ensure that sample modification can be re-started quickly without waiting for the threshold level to adapt to the characteristics of the audio signal.

It is possible to extend the technique to a two channel stereo audio system having left and right audio channels where samples are simultaneously deleted or repeated in both channels. Respective inter-sample difference magnitudes are determined for both audio channels and compared with a single threshold. In the system of FIG. 1, the comparator (4) can be replaced by a comparator which gives an output when both inter-sample differences are below the threshold. The operation of the system is otherwise unchanged: a fixed consecutive number of "below threshold" outputs from the comparator is required before a sample delete or repeat command is issued; the threshold is decremented when a command is issued; and, the threshold is incremented when either of the two current inter-sample differences is above the current threshold.

Either the single-channel or the stereo system can be improved by providing for the rate of sample modification (i.e. deletion or repetition) to be adjusted in dependence on the dynamics of the audio. If the amplitude of the audio is decaying after a loud peak, there is a short time period after the peak (of the order of a few tens of milliseconds) during which distortion of the audio caused by sample deletion or repetition will be subjectively masked. If the amplitude continues to decay, sample modification becomes more noticeable and can be perceived as a pitch change.

Figure 2:
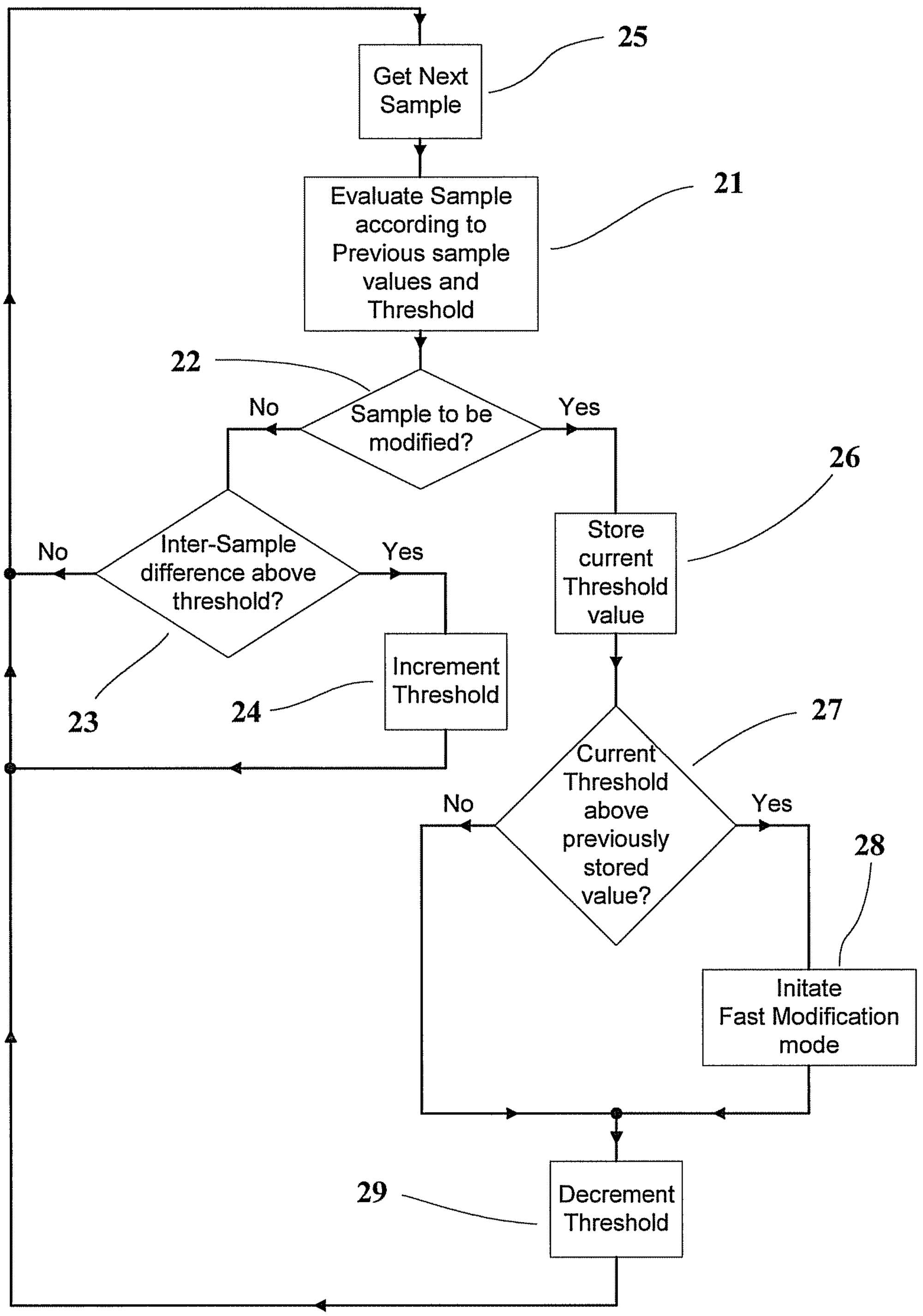
FIG. 2 shows a flow diagram illustrating a control process for audio sample deletion or repetition according to an exemplary embodiment.

In the system of FIG. 1, or the stereo version described above, the delay between a sample modification and the next permitted sample modification can be adjusted so that the delay is reduced for a short period after a peak in the audio level, and then increased to the original delay value after a fixed number of samples have been processed. FIG. 2 shows a flow-chart of a system in which the threshold level of the system of FIG. 1 is used to identify points in the audio at which the rate of sample modification can be adjusted.

Referring to FIG. 2, in step (21) an audio sample is evaluated as in the system of FIG. 1 so as to determine whether or not it should be modified (i.e. deleted or repeated). If the sample is not modified, either because the inter-sample difference is above the threshold, or because a recent previous sample has been modified, the decision step (22) passes control to decision step (23). If the difference between the current sample and its predecessor is greater than the threshold, the threshold is incremented (as described previously with reference to FIG. 1) in step (24) and the next audio sample is made available for processing in step (25). However, if the current inter-sample difference magnitude is less than the threshold at decision step (23), control is passed to step (25) without any change to the threshold value.

If the current audio sample was selected for modification in step (21), decision step (22) passes control to step (26) in which the current threshold value is stored. A further decision step (27) determines whether the current threshold value is above the threshold value stored on the previous occasion that a sample was modified. If the threshold is higher, the audio level is likely to be reducing after a peak (during which no sample modifications have occurred) and a faster rate of sample modification is likely to be acceptable. In this case, step (28) causes the delay between sample modifications to be reduced by changing the mode of operation of step (21) to a "Fast Modification" mode. This mode is maintained until a fixed number of samples have been processed in step (21).

After step (28), or a decision that the threshold is lower than at the time of the previous sample modification at step (27), the threshold value is decremented in step (29), as described with reference to FIG. (1), and control is passed to step (25) to commence the processing of the next audio sample.

In this way the Fast Modification mode is entered as the audio level begins to fall. In the Fast Modification mode the minimum permitted interval between sample modifications is set at a low value for a fixed number of samples. For example, the normal delay between modifications could be 1,024 sample periods and in the Fast Modification Mode the minimum permitted interval could be set to 32 sample periods until about 20 ms of audio has been processed; the minimum period can then be doubled after each succeeding 20 ms period until the "normal" delay of 1,024 samples is reached, or the Fast Modification mode is re-started at step (28).

When the audio is very quiet the process of FIG. 2 need not be applied, and the time delay between sample modifications can be maintained at a low value. This condition can be detected by noting that the threshold is at its minimum permitted value. Once the threshold rises, the process of FIG. 2 can again be used to control the delay between modifications.

The system of FIG. 2 is equally applicable to stereo processing.

Dropping or repeating samples has the effect of changing the pitch of tones. If tones can be recognised and the pitch measured, it is then possible to determine a permitted rate of sample modification that causes a barely perceptible pitch change for that tone and to set the minimum permitted delay to that value. If the absolute amplitude of the audio can also be measured then the permitted rate of sample modification can be adjusted knowing the effect of loudness on the perceptibility of pitch changes. The system of the invention can thus be modified by the addition of frequency or amplitude measuring processes which control the time between sample deletion or repetition. Simple frequency measurement by detecting and counting zero crossings of the audio signal, or signals for stereo, can be used.

The application of the invention to stereo audio has been described; however, it may also be extended to other multichannel audio formats such as "surround sound" or "5.1 channel" systems. In one method a multi-channel audio programme is "mixed down" to a mono or stereo version, which is analysed as described above, and samples are deleted or repeated simultaneously in all the channels of the multichannel programme in response to the analysis of the mixed-down audio.

Another method is to compare inter-sample difference values from more than two channels with the threshold; and, to adjust the threshold and simultaneously delete or repeat samples in all channels in dependence on the results of the comparisons.

The invention has been described by way of examples and other variations are possible within the scope of the following claims. It should be noted that this invention can be to hardware and/or software arrangements as will be apparent to a skilled person.

The invention claimed is:

1. A method of changing the number of samples representing a time segment of an audio signal by deleting or repeating existing samples at positions in the time segment dependent on the values of said audio samples, comprising the steps of:
- receiving an audio signal having a first number of samples representing a time segment, each sample having a sample value;
- forming differences between the respective sample values of succeeding samples by subtraction;
- comparing said differences with a threshold value;
- deleting or repeating samples where two or more consecutive differences are less than the threshold value; and
- outputting the audio signal with a second, different number of samples representing the time segment;
- wherein the threshold value is reduced when samples are deleted or repeated and
- wherein the threshold value is increased when a difference between succeeding samples exceeds the said threshold value.

2. A method according to claim 1 in which stereo audio is processed and respective left and right differences between succeeding sample values are evaluated and samples are repeated or deleted where both the left difference and the right difference are below the said threshold at two or more consecutive sample points.

3. A method according to claim 1 in which a sample is deleted or repeated in response to a defined number of consecutive inter-sample differences less than the threshold value.

4. A method according to claim 1 in which sample deletion or repetition is inhibited during a set number of sample periods following a point of sample deletion or repetition.

5. A method according to claim 4 in which the said set number of sample periods during which sample deletion or repetition is inhibited is adjusted in dependence on a cumulative measure of inter-sample difference values.

6. A method according to claim 5 in which the said set number of sample periods during which sample deletion or repetition is inhibited is reduced in response to an increase in the said threshold value.

7. A method according to claim 5 in which the said set number of sample periods during which sample deletion or repetition is inhibited is adjusted in dependence upon a measure of audio frequency.

8. A method according to claim 7 in which the said measure of audio frequency is a count of zero crossings of the audio signal.

9. A method according to claim 5 in which the said set number of sample periods during which sample deletion or repetition is inhibited is adjusted in dependence upon a measure of absolute audio amplitude.

10. Apparatus for changing the number of samples representing a time segment of an audio signal by deleting or repeating existing samples at positions in the time segment dependent on the values of said audio samples, wherein said audio signal has a first number of samples representing a time segment, each sample having a sample value, the apparatus comprising:
- a subtractor for forming differences between the respective sample values of succeeding samples;
- a comparator adapted for comparing said differences with a threshold value; and
- control logic receiving a sample rate control input and an output from said comparator and serving to provide a sample deleted or repeat command in accordance with the sample rate control input and said comparator,
- wherein the control logic is adapted to reduce the threshold value when samples are deleted or repeated and to increase the threshold value when a difference between succeeding samples exceeds the said threshold value.

11. Apparatus according to claim 10 in which stereo audio is processed and respective left and right differences between succeeding sample values are evaluated and samples are repeated or deleted where both the left difference and the right difference are below the said threshold at two or more consecutive sample points.

12. Apparatus according to claim 10 in which a sample is deleted or repeated in response to a defined number of consecutive inter-sample differences less than the threshold value.

13. Apparatus according to claim 10 in which sample deletion or repetition is inhibited during a set number of sample periods following a point of sample deletion or repetition.

14. A non-transitory computer program product comprising:
- code adapted to implement a method of changing the number of samples representing a time segment of an audio signal by deleting or repeating existing samples at positions in the time segment dependent on the values of said audio samples, comprising the steps of:
- receiving an audio signal having a first number of samples representing a time segment, each sample having a sample value;
- forming differences between the respective sample values of succeeding samples by subtraction;
- comparing said differences with a threshold value;
- deleting or repeating samples where two or more consecutive differences are less than the threshold value; and
- outputting the audio signal with a second, different number of samples representing the time segment;
- wherein the threshold value is reduced when samples are deleted or repeated, and wherein the threshold value is increased when a difference between succeeding samples exceeds the said threshold value.

* * * * *